United States Patent [19]

Berks et al.

[11] Patent Number: 5,374,384
[45] Date of Patent: Dec. 20, 1994

[54] MODELING MEDIUM

[76] Inventors: Robert R. Berks, Halyoake Ave., Orient, N.Y. 11957; Alexander Saunders, Old Albany Post Rd., Garrison, N.Y. 10524

[21] Appl. No.: 949,350

[22] Filed: Sep. 22, 1992

Related U.S. Application Data

[63] Continuation of Ser. No. 716,722, Jun. 17, 1991, abandoned.

[51] Int. Cl.$^5$ .......................... B28D 1/32; C08L 91/06
[52] U.S. Cl. ..................................... 264/110; 264/108; 106/272; 106/472; 106/417
[58] Field of Search .................. 264/108, 110; 424/64–71; 106/272, 417, 19 B, 19 D, 19 E; 8/521

[56] References Cited

U.S. PATENT DOCUMENTS

| | | | |
|---|---|---|---|
| 1,607,623 | 11/1926 | Higgins | 264/108 |
| 3,592,882 | 7/1968 | Morita | 264/108 |
| 4,840,669 | 6/1989 | Hughes et al. | 106/19 |
| 4,938,954 | 7/1990 | Gross et al. | 424/71 |
| 4,946,641 | 8/1990 | Skinner | 264/540 |
| 5,039,518 | 8/1991 | Barone et al. | 424/63 |
| 5,108,736 | 4/1992 | Schlossman | 424/64 |

*Primary Examiner*—Paul Lieberman
*Assistant Examiner*—Margaret Einsmann
*Attorney, Agent, or Firm*—Michael J. DeSha

[57] ABSTRACT

A novel modeling medium comprises a mixture of an organic ductile wax binder and a mica platelet filler which is mechanically worked while the material is in a semisolid state to evenly distribute the mica platelets throughout the mixture. The material exhibits the characteristics of non-ferrous metal with less density than conventional modeling mediums. It provides the bi-color visual characteristic of metal and may be worked at convenient temperatures.

12 Claims, 1 Drawing Sheet

MODELING MEDIUM

This application is a continuation, of application Ser. No. 07/716,722, filed Jun. 17, 1991 now abandoned.

FIELD OF THE INVENTION

The invention relates to modeling mediums such as clays and more particularly to an improvement in materials for modeling.

BACKGROUND OF THE INVENTION

Modeling materials have been known and used since ancient times. Water-based clays which were found to be capable of being molded were either sun-dried or, later, kiln-fired in the manufacture of pottery and for sculpting of objects of both practical and aesthetic value. In order to overcome some of the problems with water-based clays, other clays were formulated, the best known of which are the composition clays of the Plasticine type. These clays consist of an earth-clay, an inert filler, and varied petroleum derivatives or oils employed as plasticizers. However, these Plasticine type clays tend to remain permanently soft.

All of these known clays and waxes, which have been used by artisans and sculptors for a long period of time, have significant drawbacks which must be overcome by the artisan or sculptor in order to achieve satisfactory results when used for modeling. Since the clays tend to crumble or to sag if drawn out to fine sections, sculptors in particular find the lack of the ability to provide fine detail in the clay and its lack of responsiveness a source of continuing frustration. In order to overcome the tendency of the clay to sag, the sculptor must devise mechanical interior bracing or armatures to provide the necessary support for the model and the weight of the clay itself becomes prohibitive in large models. Further, the fact that clay does not even come close to the look of a subsequent casting in metal means that the sculptor cannot easily communicate his vision of the final casting to those people most involved in the desired result, that is, the persons commissioning the object.

SUMMARY OF THE INVENTION

It is therefore an object of the invention to provide an improved modeling material in which the aforementioned drawbacks are overcome.

Another object of the invention is to provide a material which is capable of emulating the characteristics of metals while being workable at safe temperatures rather than the elevated temperatures required for metal working.

Yet another object of the invention is to provide a modeling medium which is non-toxic and yet provides the metallic look, mechanical strength, and responsiveness to overcome the drawbacks of the known modeling materials.

In accordance with the invention, there is provided a completely new modeling medium which is a mixture comprising an organic plastic binder material, said binder material forming a ductile wax under predetermined conditions, and a filler of finely ground mica platelets, said filler comprising a percentage in the range of from about 15% to about 30% by weight of the total mixture, and said mixture being mechanically worked in a semisolid state to substantially evenly distribute the mica platelets throughout the mixture. For best results the filler is approximately 20% by weight of the total mixture.

In another aspect of the invention, there is disclosed a method for manufacturing a modeling medium comprising the steps of heating an organic ductile wax binder material to a temperature sufficient to change the binder to a liquid state, mixing a mica-platelet filler with the binder in the liquid state to form a mixture in a manner such that substantially all of the mica platelets in the filler retain their structure, decreasing the temperature of the mixture to a point where it changes to a semi-solid state, and thereupon mechanically working the mixture to substantially evenly distribute the mica platelets throughout the mixture.

In a further embodiment, there is added to the binder mix finely divided carbon black in proportion of about one half % by weight. The mixture, after being worked in accordance with the invention, results in a material having enhanced bi-color aspects of metal and capable of achieving higher polish. When an oil is applied and wiped on the surface, the mica platelets of the filler which are at the surface are cleaned and aligned.

The material imitates non-ferrous metals both visually and in grain structure. The grain structure at a cold fracture is similar to that of bronze.

In the preferred embodiments, the mixture comprises FDA-approved cosmetic grade materials and is non-toxic in respect to both skin contact and ingestion. It is therefore suitable for consumer markets. It will be appreciated that the mixture may be used for all modeling purposes including sculpture, mechanical design, architectural design, education, stress and physical therapy, games, toys and graphics.

A further advantage is that since the material burns cleanly, it may be used directly as a model material for sculptural works to be cast in bronze or other metal by the so-called Lost Wax Process.

Yet another advantage is that the density of the modeling medium in accordance with the invention is about two-thirds that of the previously known modeling clays, thus making easier the handling and support.

In accordance with other aspects of the invention, the mica platelet filler may be bonded with acrylics, lacquers, thermo-set plastics, and UV-setting plastics to achieve a wide variety of physical characteristics useful for painting, modeling, patina of bronze sculpture, permanent sculpture and other objects.

DESCRIPTION OF THE DRAWING

These and other advantages and objects will become more apparent in the description of the examples below and the single FIGURE wherein:

The FIGURE illustrates the method for manufacturing the modeling medium in accordance with the invention.

DESCRIPTION OF THE PREFERRED EMBODIMENTS

Figure 1:
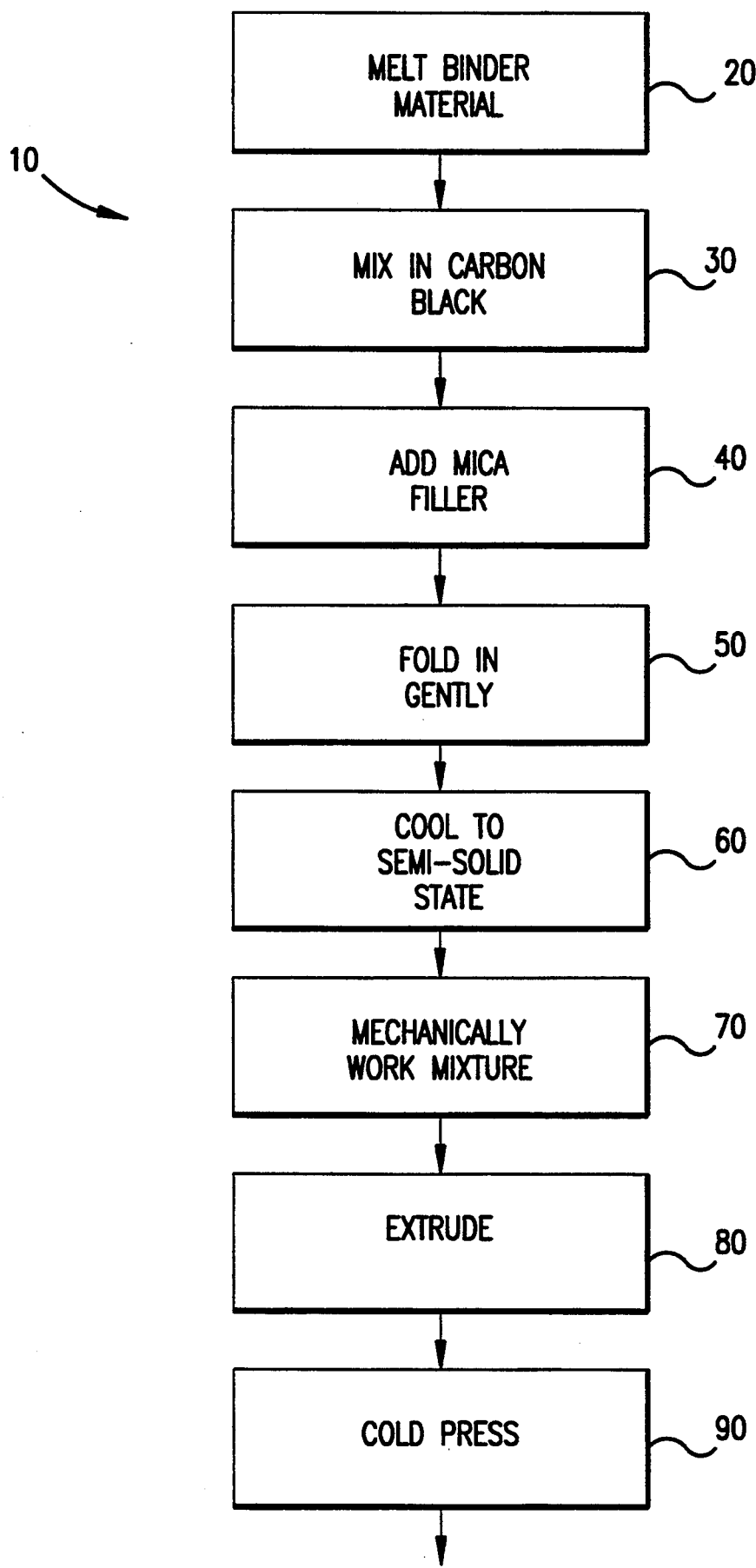

Turning now to the single Figure of the Drawing, the steps of the method for manufacturing the improved medium in accordance with the invention are illustrated at 10. A suitable binder material is heated, block 20, until it becomes liquified. It has been found that the binder material may be any organic material which forms a ductile wax within a convenient range of temperatures near room temperature. Thus butter, thermosetting plastics such as the phenolic resins available, for example, from Hercules Inc. of Wilmington, Del., ultraviolet-setting plastics such as, for example, Hercules Photopolymer EDP-1468 from Hercules Inc., beeswax, and any of the micro-crystalline waxes may be utilized as the binder material. It will also be understood that the mica filler could be mixed with a lacquer such as, for instance, Syncrylac #1478 Clear available from Maas & Waldstein, Newark, N.J. if desired.

The preferred materials are a microcrystalline wax formulated by Bareco in Tulsa, Okla., which is sold under the brand name Victory Amber, and a variant of this material which has other plasticizers (not listed in the product specifications) in a formulation marketed as Bennett #1 Modeling Wax available from Bennett Products, Ashfield, Pennsylvania. Either of these waxes is heated to a temperature of approximately 185° F. until it becomes liquid. It will be appreciated that other materials will have different melting points and must be heated to the temperature that causes them to melt.

The addition of finely-divided carbon black at this point, block 30, suitably by utilizing a planetary mixer such as one available from the Hobart Co. to mix the carbon black with the binder, has been found to be advantageous in a preferred embodiment to enhance the desired metallic characteristics by providing a dual color simulating the oxidizing of the grains of metal and to allow polishing of the material as described below. It will be understood that the carbon black is not required to obtain the novel mechanical characteristics of the medium in accordance with the invention.

At block 40, a filler material is added to the binder. In the preferred embodiments, this filler material is finely ground mica, which is available in a range of colors from the Mearl Company. The mica in these products is in the form of extremely thin platelets ranging in length from about 9-microns to about 150-microns. The available colors include metallic colors such as bronze, silver, pewter, gold and the like as well as the primary colors. The various primary colors of the mica filler may be mixed to obtain any desired color.

The filler may be added in amounts that range between about 15% to about 30% by weight of the total mixture. If too little is added it is hard to maintain color control and to obtain the desired ductility. Similarly if too much filler is added it has been found that the mixture again loses ductility and becomes crumbly.

It will be appreciated that other filler materials may be mixed in the binder. These include metallic grains or plastic fibers. However, another significant advantage of the preferred mixture of the finely ground mica material and the microcrystalline wax binder is that these materials are FDA approved cosmetic grade materials and are considered non-toxic for both skin contact and ingestion. Thus in these preferred embodiments, the modeling material is safe and can be used for all modeling purposes such as sculpturing, education as well as in toys without fear of toxicity.

For best results the filler is gently folded into the liquid binder. It has been found to be necessary that the platelets not be crushed or be as little crushed as possible since the desired characteristics of the new medium depend, it is believed, upon the platelets maintaining the size differences and keeping their structure in order to provide the ductility of the medium and the desirable metallic emulation.

At this point, shown as block 50, the resulting mixture is cooled. Suitably, this may be accomplished simply by pouring it onto a large slab or other surface where it is allowed to cool to approximately 160° F. to begin to gel. In addition to the use of other materials which have different melting temperatures, it has been found that the temperature at which the material becomes manually ductile can be controlled by the addition of either mineral oil or petroleum jelly. Further, it has been found to be important that throughout the next steps the mixture be maintained at a temperature where it will have sufficient plasticity to allow it to be properly worked to cause the alignment of the platelets within the medium.

The next step, block 70, is a mechanical working of the material to integrate the mica particles within the medium. It should be recognized that the mechanical working as used herein can be accomplished simply by kneading the mixture. To be mechanically worked in accordance with the invention, the material must be pressed and preferably subjected to cold forces such that the mica platelets tend to be evenly distributed. It has been found that this required mechanical working may be accomplished, for example, by pounding small sections with a hammer. This is, of course, inefficient for large batches. It has been found that for best results, the material may be forced between two closely spaced counter-rotating augers which press and stretch the mixture to cause it to take on the characteristics required for a modeling medium. Such counter-rotating augers are found, for example, in a so-called "Butter Printer" utilized in the dairy industry for shaping butter, which was obtained from Marpac Company, Toledo, Ohio and which has been found to be suitable to mechanically work the mixture.

For best results in practice, the "butter printer" apparatus is maintained at approximately 160° F. for work with the microcrystalline wax materials of the preferred embodiments, or at a similarly suitable temperature for the other materials, so that the wax mixture remains workable as it is being fed through the augers. After traveling through the augers and being subjected to the forces for amalgamating the mica platelets more evenly throughout the medium, the material is extruded in any desirable form, block 80. For example, this extrusion may be in the form of ribbons, strings, or as slabs in various thicknesses and widths.

It is believed that the medium will be most easily worked by the subsequent user if it is available in fairly thin sheets. The extruded slabs may thus be cold-rolled to any desired thickness, block 90. Another significant advantage of the medium is that if the subsequent user finds that the material hardens too much for working as desired, it may be softened by raising the temperature of the medium, suitably, for example, by working in a warmer ambient temperature or by heating it with forced hot air, as from a hair dryer. It will be appreciated that the method chosen will depend on the scale of the material to be worked.

As previously stated, the material in accordance with the invention imitates non-ferrous materials in visual appearance. With few exceptions, metals tarnish and oxidize. Thus a major visual characteristic of metal is the bi-color appearance of the surface which is achieved by cleaning off oxidation by chemical treatment or by abrading it away and thereby revealing the lightened, clean color of metal at any part of the surface. This effect may be achieved in the medium in accordance with the invention by first rubbing only the desired areas gently as one would polish metal with ones finger. This action tends to align the larger platelets parallel to the surface at the places where the rubbing has occurred. These particles then appear as the lighter, clean area comparable to the abraded surfaces of metal. The platelets in the material can be aligned and realigned so that the random, micro-geometric rearrangement of platelets creates variations of surface dullness and brightness, thereby simulating metallic bi-coloration.

When carbon black is incorporated in the medium, gently rubbing the surface with a small amount of oil will remove the carbon black and complete the alignment and exposure of the mica platelets at these points to give the illusion of cleaned and polished, highlighted metal. It will be understood that with the mechanical working in accordance with the invention, the metallic look is not just a superficial appearance since the mica is thoroughly integrated throughout the medium. Bi-coloration can be achieved on the surface of any exposed part or particle at any time during the process of manipulation, compressing, twisting, or incising. It will be appreciated that manipulation of the material enhances the metallic look. It will be further appreciated that the material in its most finely drawn-out condition still retains its opacity; it has the same appearance as opaque, reflective metal.

Another quality of the material in accordance with the invention is that it can be welded to itself by pressing one piece to another and blending the joint so that the juncture is essentially undetectable. This manual welding is comparable to the welding of metal without requiring the high temperatures necessary for the welding of metals.

It has also been found that the filler in the medium leaves no significant residue when castings are made using it in a lost wax process of metal casting. The casting is unaffected by the meltout of the medium. The sculptor's needs for a modeling medium and metal casting are reduced and simplified; that is, the sculptured model can be burned out directly for the casting, eliminating the previously required intermediate mold.

It will be appreciated that none of the previously known modeling mediums of clay and wax provide surfaces that can be burnished and made reflective. In addition to the bi-color aspects, the medium in accordance with the invention has been found to be firmer and at the same time more ductile than the previously known mediums. It is believed that as the mica platelets become aligned, the plate structure becomes firmer and the platelets are able to more easily slide past one another, thereby increasing the ductility of the medium.

The following are examples of the preferred formulations of the mixture of the medium, manufactured as described above, in accordance with the invention:

EXAMPLE 1

| Binder: | Bennett #1 Modeling Wax | 8 parts by weight |
| Filler: | Mearl Aztec Gold or equivalent | 2 parts by weight |

EXAMPLE 2

| Binder: | Victory Amber | 8 parts by weight |
| Filler: | Mearl Aztec Gold or equivalent | 2 parts by weight |

These mediums were tested against Plastelena at 70° F. to compare sagging characteristics:

A Plastelena clay slab 1/16"×2"×½" at this temperature sagged 90° in five (5) hours. A comparable slab of the medium in accordance with the invention, but of even longer length, 1/16"×3"×½" sagged only 5° in the same length of time.

It will be understood that the materials used in the preferred embodiments described in the examples given above are all non-toxic and suitable for use in any modeling situation for professional use or for play.

While the invention has been particularly shown and described with respect to preferred embodiments thereof, it will be understood by those skilled in the art that changes in form and details may be made therein without departing from the scope and spirit of the invention.

What is claimed is:

1. A mixture comprising an organic plastic binder material, said binder material being a wax which is ductile at a range of temperatures between room temperature and 160 degrees Fahrenheit, the binder having mixed therewith finely divided carbon black in proportion of about one-half percent by weight of the total mixture; and a filler of finely ground mica platelets, said filler comprising a percentage in the range of from about 15% to about 30% by weight of the total mixture; and said mixture being mechanically worked in a semi-solid state to evenly distribute and align the mica platelets.

2. The mixture of claim 1 wherein the filler comprises about 20% by weight of the total mixture.

3. The mixture of claim 1 wherein the binder is a microcrystalline wax.

4. A method for manufacturing a modeling medium comprising the steps of heating an organic ductile wax binder material to a temperature sufficient to place the binder in a liquid state, adding finely divided carbon black in proportion of about one-half percent by weight of the total mixture to the binder material, gently folding a mica-platelet filler into the binder in the liquid state to form a mixture such that substantially all of the mica platelets in the filler retain their size distribution and structure in the mixture, decreasing the temperature of the mixture to a point where the mixture changes to a semi-solid state, and thereupon mechanically working the mixture to distribute the mica platelets substantially evenly throughout the mixture and to orient and align them in a substantially parallel structure.

5. The method of claim 4 further comprising the step of thereafter extruding the mixture.

6. The method of claim 4 wherein the binder material is a microcrystalline wax.

7. The method of claim 4 wherein the filler is in a range of about 15% to about 30% by weight of the total mixture.

8. The method of claim 7 wherein the filler is about 20% by weight of the total mixture.

9. A method of providing a modeling medium comprising the step of mechanically working in a semisolid state a mixture which comprises an organic plastic binder material having finely divided carbon black in proportion of about one-half percent by weight of the total mixture mixed therewith, said binder material being a wax which is ductile at a range of temperatures between room temperature and 160 degrees Fahrenheit; and a filler of finely ground mica platelets, said filler comprising a percentage in the range of from about 15% to about 30% by weight of the total mixture.

10. The method of claim 9 wherein the binder material is a microcrystalline wax.

11. The method of claim 9 wherein the filler is in a range of about 15% to about 30% by weight of the total mixture.

12. The method of claim 11 wherein said filler is about 20% by weight of the total mixture.

* * * * *